(12) United States Patent
Faizan et al.

(10) Patent No.: US 12,543,875 B2
(45) Date of Patent: Feb. 10, 2026

(54) KNIFE HOLDER FOR A KNIFE

(71) Applicant: Mirza Faizan, Irving, TX (US)

(72) Inventors: Mirza Faizan, Irving, TX (US); Aarav Patel, Frisco, TX (US); Akshara Kommidi, Plano, TX (US); Ishaaq Mohammed Ali, Plano, TX (US); Ismail Mohammed Ali, Plano, TX (US); Raisha Bhojani, Euless, TX (US); Eyad Ismail, Southlake, TX (US); Manyatha Simhambhatla, Frisco, TX (US); Zaynab Khan, Murphy, TX (US); Sheik Ahamed Azigar Ali, Frisco, TX (US); Hisham Ahmad, Allen, TX (US); Mirza Rizwan, Patna (IN); Ashaz Haque, Patna (IN); Aarifa Fatima, Patna (IN); Saadia Asaf, Aligarh (IN); Mansoor Hasan Khan, Aligarh (IN)

(*) Notice: Subject to any disclaimer, the term of this patent is extended or adjusted under 35 U.S.C. 154(b) by 30 days.

(21) Appl. No.: 18/582,725

(22) Filed: Feb. 21, 2024

(65) Prior Publication Data
US 2025/0261774 A1 Aug. 21, 2025

(51) Int. Cl.
A47G 21/14 (2006.01)
E05B 47/00 (2006.01)

(52) U.S. Cl.
CPC .......... A47G 21/14 (2013.01); E05B 47/0001 (2013.01); E05B 2047/005 (2013.01); E05B 2047/0084 (2013.01)

(58) Field of Classification Search
CPC ................ A47G 21/14; E05B 47/0001; E05B 2047/005; E05B 2047/0084; A47B 81/00; A47F 7/0028
See application file for complete search history.

(56) References Cited

U.S. PATENT DOCUMENTS

| | | | | |
|---|---|---|---|---|
| 4,604,836 A | * | 8/1986 | Huang | B24D 15/084 451/555 |
| 5,245,756 A | * | 9/1993 | Howell | A47G 21/14 30/151 |
| 6,079,108 A | * | 6/2000 | Lin | A47G 21/14 248/37.3 |

(Continued)

FOREIGN PATENT DOCUMENTS

| | | | | |
|---|---|---|---|---|
| EP | 3747598 A1 | * | 12/2020 | ............. A47G 21/14 |
| GB | 2529430 A | * | 2/2016 | ............. A47G 21/14 |

(Continued)

Primary Examiner — Stanton L Krycinski

(57) ABSTRACT

A knife holder for holding a knife includes a block defining a cavity to receive the knife, and a casing removably arranged inside the cavity and adapted to be locked with the block. The knife is removably arranged inside the casing. A lock structure locks the casing with the block to prevent the removal of the casing from the cavity. Moreover, a switch is adapted to be actuated by a user to enable an unlocking of the casing from the block to enable a removal of the casing from the block. A near field communication device is configured to determine a presence of an authorized user in a vicinity of the knife holder and facilitates an unlocking of the casing from the block in response to an actuation of the switch in the presence of the authorized user in the vicinity of the knife holder.

14 Claims, 4 Drawing Sheets

(56) References Cited

U.S. PATENT DOCUMENTS

| | | | | |
|---|---|---|---|---|
| 6,371,312 | B1* | 4/2002 | Tsuchida | A47G 21/14 248/37.3 |
| 6,854,186 | B2* | 2/2005 | Basden | A47G 21/14 248/37.3 |
| 8,012,426 | B2* | 9/2011 | Bonapace | A47G 21/14 250/455.11 |
| 8,590,427 | B2* | 11/2013 | Murphy | B24D 15/084 206/349 |
| 9,149,914 | B2* | 10/2015 | Barber | B24D 15/084 |
| 10,638,863 | B2* | 5/2020 | Liu | B24D 15/081 |
| 11,191,378 | B2* | 12/2021 | Spence | E05B 73/00 |
| 11,229,306 | B2* | 1/2022 | Schmidt | H01F 7/04 |
| 11,412,873 | B2* | 8/2022 | Kelly | E05B 73/00 |
| 12,004,666 | B2* | 6/2024 | Hamad | A47G 21/14 |
| 2007/0278165 | A1* | 12/2007 | Ranieri | A47G 21/14 211/70.7 |
| 2011/0084177 | A1* | 4/2011 | Curwen | A47G 21/14 248/37.3 |
| 2011/0283547 | A1* | 11/2011 | Wang | A47G 21/14 30/298.4 |
| 2012/0266468 | A1* | 10/2012 | Murphy | B24D 15/084 30/298.4 |
| 2018/0000268 | A1* | 1/2018 | Zhijian | G07C 9/00563 |
| 2018/0055259 | A1* | 3/2018 | Hagger | B26B 29/025 |
| 2021/0244216 | A1* | 8/2021 | Kelly | G07C 9/37 |

FOREIGN PATENT DOCUMENTS

| | | | | |
|---|---|---|---|---|
| WO | WO-0235974 | A1* | 5/2002 | A47G 21/14 |
| WO | WO-02092288 | A2* | 11/2002 | A47G 21/14 |

* cited by examiner

KNIFE HOLDER FOR A KNIFE

BACKGROUND

1. Technical Field

The present disclosure relates, generally, to a knife holder, and more particularly to a knife assembly having a knife holder and a knife that prevents removal of the knife from the knife holder to an unauthorized user.

2. Description of the Prior Art

Generally, a knife is a tool having at least one sharp edge used for cutting different edible items in every household. In a residential house, sometimes parents unconsciously leave it in a place for e.g. a kitchen sink etc. from where it becomes easily accessible to children. In the absence of parents' sight, some children might play with the knife. While playing with the knife, the children are vulnerable to a chance of being injured due to the sharp edges of the knife.

SUMMARY

In one aspect, a knife holder for holding a knife is disclosed. The knife holder includes a block defining at least one cavity to receive the at least one knife, and at least one casing removably arranged inside the at least one cavity and adapted to be locked with the block. The at least one knife is removably arranged inside the at least one casing. The knife holder further includes a lock structure configured to lock the at least one casing with the block to prevent the removal of the at least one casing from the at least one cavity, and a switch adapted to be actuated by a user to enable an unlocking of the at least one casing from the block to enable a removal of the at least one casing from the block. The knife holder also includes a near field communication device configured to determine a presence of an authorized user in a vicinity of the knife holder and facilitates an unlocking of the at least one casing from the block in response to an actuation of the switch in the presence of the authorized user in the vicinity of the knife holder.

In some additional, alternative, or selectively cumulative embodiments, the knife holder further includes an actuator adapted to move the lock structure to an unlock state based on a signal received from the near field communication device and the actuation of the switch.

In some additional, alternative, or selectively cumulative embodiments, the lock structure is a first lock structure and the knife holder includes a second lock structure to lock the at least one knife with the at least one casing.

In some additional, alternative, or selectively cumulative embodiments, the second lock structure includes a gear adapted to be engaged with the associated knife. The knife includes a plurality of teeth extending along a non-cutting edge of the knife and the gear engages with the plurality of teeth upon insertion of the knife inside the at least one casing.

In some additional, alternative, or selectively cumulative embodiments, the gear includes a groove, and the second lock structure includes a pin adapted to be displaced to an extended position and a retracted position. In the extended position, the pin extends inside the groove locking the gear with knife, and in the retracted position, the pin is arranged outwardly of the groove enabling a rotation of the gear and removal of the knife from the associated casing.

In some additional, alternative, or selectively cumulative embodiments, the knife holder further includes at least one second actuator to displace the pin from the extended position to the retracted position in response to at least one of a signal received from the near field communication device or the actuation of the switch.

In some additional, alternative, or selectively cumulative embodiments, the at least casing includes a first half portion and a second half portion removably or pivotably engaged with the first half portion.

In accordance with an embodiment of the disclosure, a knife assembly is disclosed. The knife assembly includes at least one knife and a knife holder to securely hold the at least one knife. The knife holder includes a block defining at least one cavity to receive the at least one knife, and at least one casing removably arranged inside the at least one cavity and adapted to be locked with the block. The at least one knife is removably arranged inside the at least one casing. The knife holder further includes a lock structure configured to lock the at least one casing with the block to prevent the removal of the at least one casing from the at least one cavity, a switch adapted to be actuated by a user to enable an unlocking of the at least one casing from the block to enable a removal of the at least one casing from the block and a near field communication device configured to determine a presence of an authorized user in a vicinity of the knife holder and facilitates an unlocking of the at least one casing from the block in response to an actuation of the switch in the presence of the authorized user in the vicinity of the knife holder.

In some additional, alternative, or selectively cumulative embodiments, the knife holder further includes an actuator adapted to move the lock structure to an unlock state based on a signal received from the near field communication device and the actuation of the switch.

In some additional, alternative, or selectively cumulative embodiments, the lock structure is a first lock structure and the knife holder includes a second lock structure to lock the at least one knife with the at least one casing.

In some additional, alternative, or selectively cumulative embodiments, the knife includes a plurality of teeth extending along a non-cutting edge of the knife, and the second lock structure includes a gear mounted to the block and adapted to be engaged with the plurality of teeth upon insertion of the knife inside the at least one casing.

In some additional, alternative, or selectively cumulative embodiments, the gear includes a groove, and the second lock structure includes a pin adapted to be displaced to an extended position and a retracted position. In the extended position, the pin extends inside the groove locking the gear with knife, and in the retracted position, the pin is arranged outwardly of the groove enabling a rotation of the gear and removal of the knife from the associated casing.

In some additional, alternative, or selectively cumulative embodiments, the knife holder further includes at least one second actuator to displace the pin from the extended position to the retracted position in response to at least one of a signal received from the near field communication device or the actuation of the switch.

In some additional, alternative, or selectively cumulative embodiments, the at least casing includes a first half portion and a second half portion removably or pivotably engaged with the first half portion.

In some additional, alternative, or selectively cumulative embodiments, the knife assembly further includes a wearable device adapted to be worn by a user and configured to communicate with the near field communication device. The near field communication device determines the presence of the authorized user based on a signal received from the wearable device.

In accordance with an embodiment of the disclosure, a knife assembly is disclosed. The knife assembly includes at least one knife and a knife holder to securely hold the at least one knife. The knife holder includes a block defining at least one cavity to receive the at least one knife, and at least one casing removably arranged inside the at least one cavity and adapted to be locked with the block. The at least one knife is removably arranged inside the at least one casing. The knife holder further includes a lock structure mounted to the block and configured to lock the at least one casing with the block to the prevent the removal of the at least one casing from the at least one cavity, and a switch mounted to the block and adapted to be actuated by a user to enable an unlocking of the at least one casing from the block to enable a removal of the at least one casing from the block. Moreover, the knife holder includes a near field communication device configured to determine a presence of an authorized user in a vicinity of the knife holder, and an actuator adapted to move the lock structure to an unlock state to unlock the at least one casing from the block in response to an actuation of the switch and a signal received from the near field communication device. The knife assembly further includes a wearable device adapted to be worn by a user and configured to communicate with the near field communication device. The near field communication device determines the presence of the authorized user based on a signal received from the wearable device.

In some additional, alternative, or selectively cumulative embodiments, the lock structure is a first lock structure and the knife holder includes a second lock structure to lock the at least one knife with the at least one casing.

In some additional, alternative, or selectively cumulative embodiments, the knife includes a plurality of teeth extending along a non-cutting edge of the knife, and the second lock structure includes a gear mounted to the block and adapted to be engaged with the plurality of teeth upon insertion of the knife inside the at least one casing.

In some additional, alternative, or selectively cumulative embodiments, the gear includes a groove, and the second lock structure includes a pin adapted to be displaced to an extended position and a retracted position. In the extended position, the pin extends inside the groove locking the gear with knife, and in the retracted position, the pin is arranged outwardly of the groove enabling a rotation of the gear and removal of the knife from the associated casing.

In some additional, alternative, or selectively cumulative embodiments, the knife holder further includes at least one second actuator to displace the pin from the extended position to the retracted position in response to at least one of a signal received from the near field communication device or the actuation of the switch.

DETAILED DESCRIPTION

Figure 1:
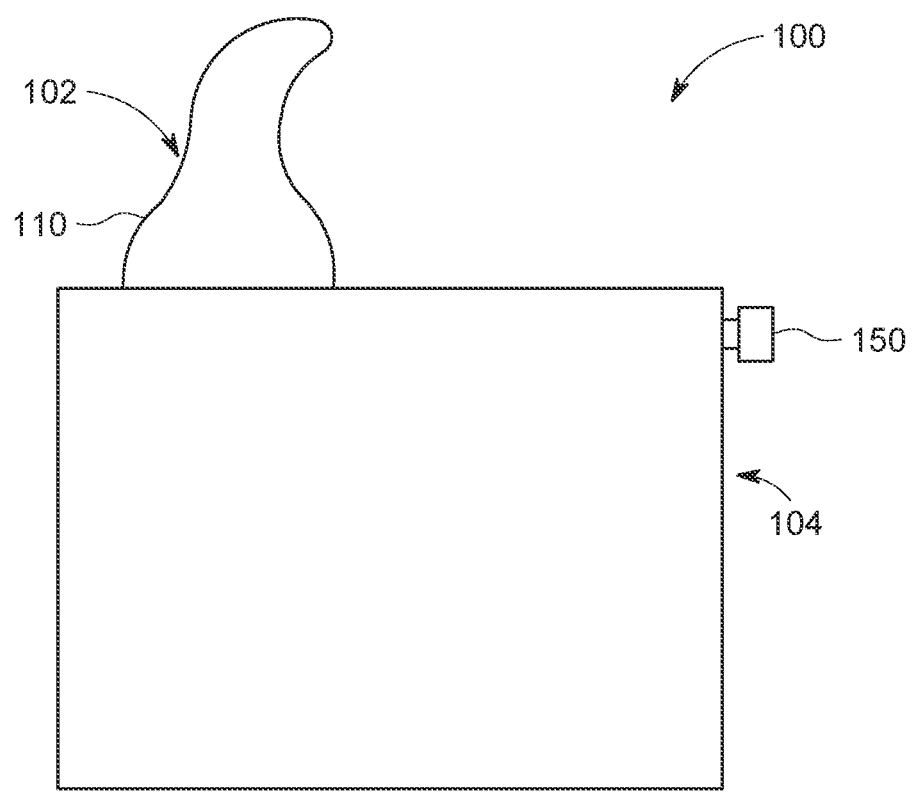
FIG. 1 is a front view of a knife assembly depicting a knife extending inside a knife holder, in accordance with one embodiment of the present disclosure.
Figure 2:
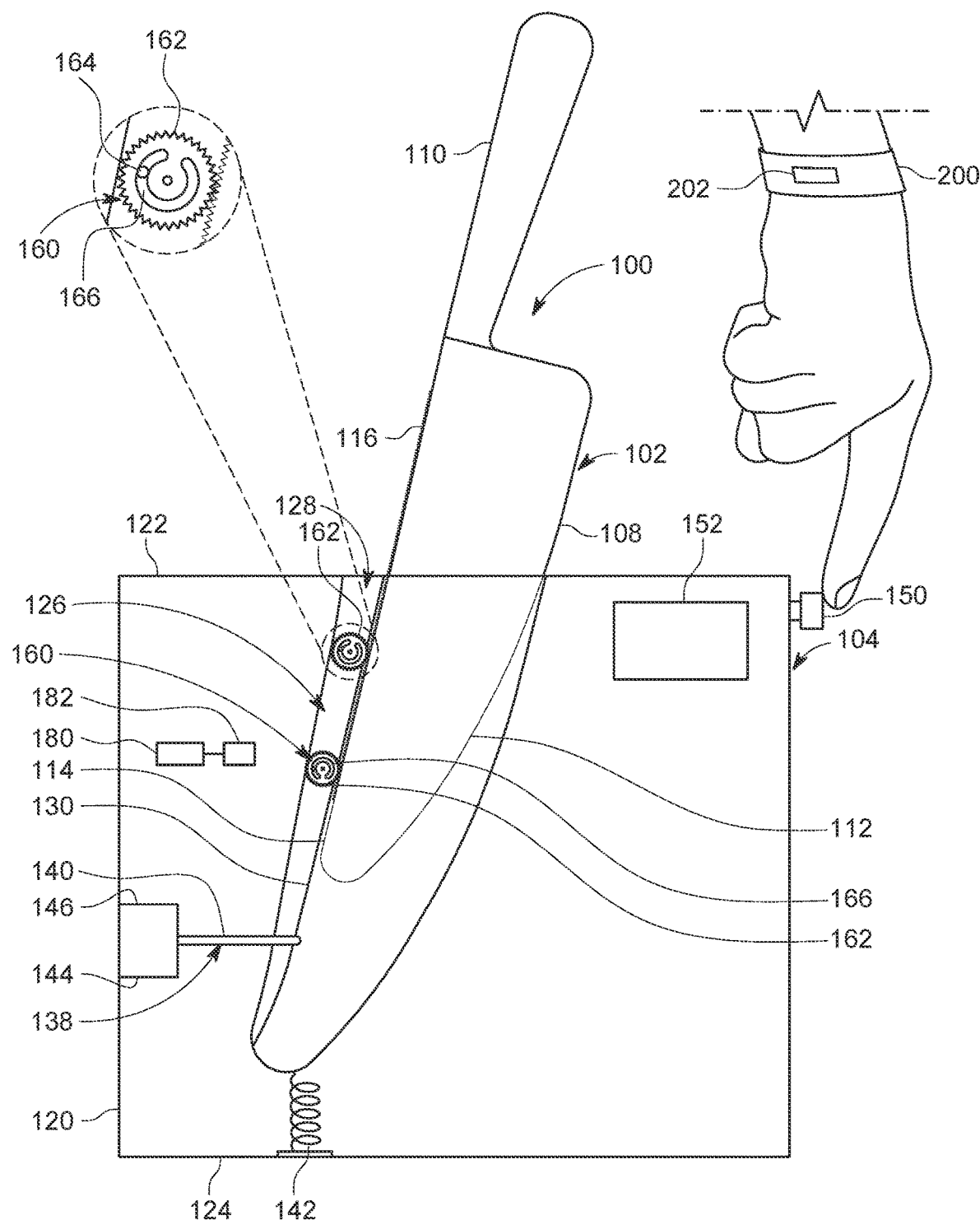
FIG. 2 is a schematic front view of the knife assembly depicting internal components of the knife holder, in accordance with one embodiment of the present disclosure.

Referring to FIG. 1, a knife assembly 100 having at least one knife 102 and a knife holder 104 to hold the at least one knife 102 is disclosed. Referring to FIG. 2, the knife 102 includes a blade 108 and a handle 110 extending longitudinally from the blade 108. Moreover, the blade 108 includes a cutting edge 112 to enable a cutting of an object and a non-cutting edge 114 arranged opposite to the cutting edge 112. In the illustrated embodiments, the knife 102 includes a plurality of teeth 116 extending along at least a portion of the non-cutting edge 114 to enable a locking of the knife 102 with the knife holder 104.

As shown, the knife holder 104 includes a block 120 having a first end 122 i.e., top end 122 and a second end 124 i.e., bottom end 124, and defines at least one cavity 126 to receive the least one knife 102. The cavity 126 extends from the top end 122 towards the bottom end 124 with an opening 128 of the cavity 126 disposed at the top end 122 to enable an insertion and removal of the knife 102 from the cavity 126. It may be appreciated that although a single cavity 126 is shown and contemplated, the block 120 may define a plurality of cavities to hold and retain a plurality of knifes.

Figure 3:
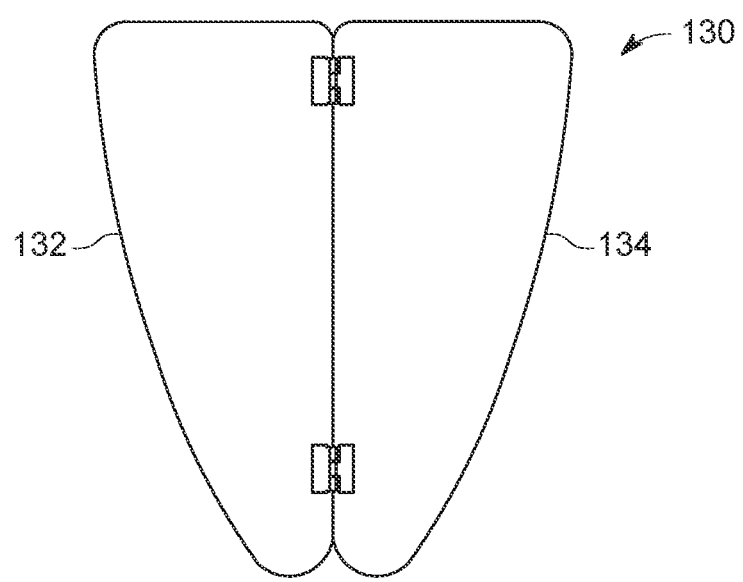
FIG. 3 is a schematic view of a casing of the knife holder having a first half portion and a second half portion, in accordance with one embodiment of the present disclosure.

Moreover, the knife holder 104 includes a casing 130 removably arranged inside the cavity 126 and the knife 102 (i.e., blade 108) is arranged inside the casing 130 when inserted inside the knife holder 104. In some embodiments, the casing 130 may be made of a suitable material that prevents/restricts a damage of the cutting edge 112 of the blade 108 during insertion and removal of the knife 102 inside the casing 130. In some embodiments, as shown in FIG. 3, the casing 130 includes a first half portion 132 and a second half portion 134 removably or pivotably engaged with the first half portion 132. By having the two half portions 132, 134, the casing 130 may be cleaned from inside.

Further, the casing 130 is adapted to be locked with the block 120 to prevent any unauthorized removal of the casing 130 from the cavity 126. Referring again to FIG. 2, to lock the casing 130 with the block 120, the knife holder 104 includes a lock structure 138, for example, a first lock structure 138, mounted to the block 120 and adapted to be displaced between a lock state and an unlock state. In the lock state, the first lock structure 138 locks the casing 130 with the block 120 and prevents the removal of the casing 130 from the cavity 126, while in the unlock state, the first lock structure 138 allows the removal of the casing 130 from the cavity 126. In some embodiments, the first lock structure 138 includes a pin 140 mounted to the block 120 and adapted to extend and retract relative to the block 120.

In the lock state, the pin 140 is engaged to the casing 130, while in the unlock state, the pin 140 is arranged distally from the casing 130. In some embodiments, as shown in FIG. 2, a spring 142 may be arranged between the casing 130 and an inner surface of the block 120. The spring 142 is adapted to push the casing 130 upwardly in response to the movement of the first lock structure 138 to the unlock state. Accordingly, the spring 142 is compressed when the casing 130 is arranged inside cavity 126 and locked with the block 120. To move the pin 140 and hence the first lock structure 138 between the lock state and the unlock state, the knife holder 104 includes an actuator 144, for example, a first actuator 144. In an embodiment, the first actuator 144 is a solenoid operated actuator 146 that displaces the pin 140 to unlock the casing 130 from the block 120. In an embodiment, the solenoid operated actuator 146 may be a solenoid operated linear actuator, for example, an electric motor, a cylinder, or any other actuator known in the art.

Further, the first actuator 144 moves the first lock structure 138 to the unlock state based on an input received from an authorized user. To facilitate the operation/actuation of the first actuator 144 by the authorized user, the knife holder 104 includes a switch 150 adapted to be actuated by an authorized user and is coupled to the block 120. To facilitate a determination that the switch 150 is actuated by the authorized user, the knife holder 104 includes a near field communication (NFC) device 152 that interacts with a wearable device 200 having a NFC unit 202 that interacts with NFC device 152, and the NFC device based on the interaction with NFC unit 202 determines if the user is an authorized user or not. In an embodiment, the wearable device 200 may be a band, a ring, a strap, or any other such device, adapted to be worn by the user. Accordingly, the switch 150 actuates the first actuator 144 only when the switch 150 is operated when the wearable device 200 is within a close proximity, i.e., predetermined distance, of the block 120. Upon actuation of the first actuator 144, the first actuator 144 moves the lock structure 138 to the unlock state i.e., retracts the pin 140, thereby unlocking the casing 130 from the block 120.

Additionally, the knife holder 104 includes at least one second lock structure 160 to lock the knife 102 with the casing 130 and/or the block 120. As shown, each second lock structure 160 includes a gear 162 mounted to the casing 130 or the block 120 and extending at least partially inside casing 130. The gear 162 is arranged to engage with the plurality of teeth 116 of the knife 102 when the knife 102 is disposed inside the casing 130 or inserted inside the casing 130. Further, the second lock structure 160 includes a pin 164 movably coupled to the block 120 or the casing 130 and configured to engage with the gear 162 to prevent a rotation of the gear 162 and thereby lock the gear 162 with the teeth 116 of the knife 102, and hence locking the knife 102 inside the knife holder 104.

In the illustrated embodiment, the pin 164 is arranged to be displaced between an extended position and a retracted position. To facilitate the engagement of the pin 164 with the gear 162 and prevent the rotation of the gear 162, the gear 162 defines at least one groove 166 in which the pin 164 extends in the extended position. In an embodiment, the groove 166 may an arcuate groove extending arcuately around a central axis of the gear 162. It may be appreciated that in the retracted position, the pin 164 is arranged away/outwardly of the groove 166. Accordingly, to remove the knife 102 from the knife holder 104, the pin 164 is moved to the retracted position to allow the rotation of the gear 162 about its central axis, which in turn allows the removal of the knife 102 from the casing 130 i.e., knife holder 104.

Figure 4:
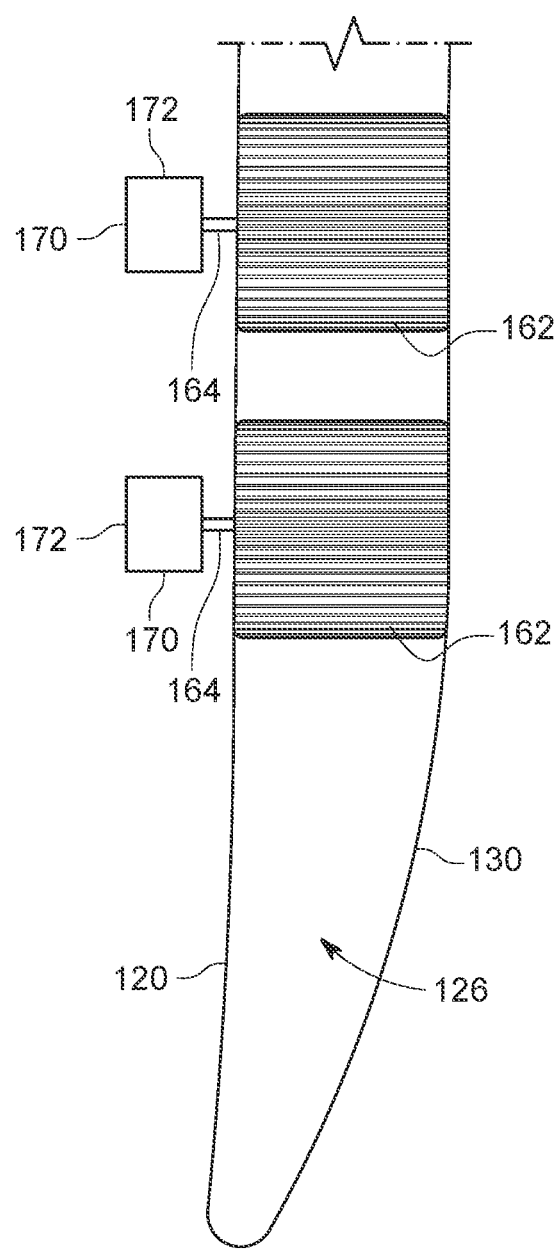
FIG. 4 is a schematic side view of the knife holder depicting a second lock structure of the knife holder, in accordance with one embodiment of the present disclosure.

Referring to FIG. 4, to move/displace the pin 164 to the retracted position, the knife holder 104 includes a second actuator 170 that may be a solenoid operated actuator 172. It may be appreciated that the second actuator 170 is actuated simultaneously with the first actuator 144 upon actuation of the switch 150 by the authorized user i.e., the user having/wearing the wearable device 200. It may be appreciated that the pin 164 is biased to the extended position and moves to a retracted position upon actuation of the second actuator 170.

Furthermore, in some embodiments, the knife holder 104 includes a battery 180 (shown in FIG. 2) to power one or more electrical and electronic components of the knife holder 104. Further, the knife holder 104 may include a dynamo 182, as shown in FIG. 2, to generate electric power in response to the rotation of the gear 162 during the removal and insertion of the knife 102 inside the casing 130 i.e., block 120 to generate electric power that is used to recharge the battery 180. In some embodiments, the battery 180 may be a non-rechargeable battery. In some embodiments, the dynamo 182 may be omitted, and the battery 180 may be charged by electrically connecting the battery 180 to an external power source vias suitable electric wire.

The foregoing description of embodiments and examples has been presented for purposes of illustration and description. It is not intended to be exhaustive or to limit the invention to the forms described. Numerous modifications are possible in light of the above teachings. Some of those modifications have been discussed and others will be understood by those skilled in the art. The embodiments were chosen and described in order to best illustrate certain principles and various embodiments as are suited to the particular use contemplated. The scope of the invention is, of course, not limited to the examples or embodiments set forth herein, but can be employed in any number of applications and equivalent devices by those of ordinary skill in the art. Rather it is hereby intended that the scope of the invention be defined by the claims appended hereto.

What is claimed is:

1. A knife holder for holding at least one knife, the knife holder comprising:
    a block defining at least one cavity to receive the at least one knife;
    at least one casing removably arranged inside the at least one cavity and adapted to be locked with the block, the at least one knife is removably arranged inside the at least one casing;
    a lock structure configured to lock the at least one casing with the block to prevent the removal of the at least one casing from the at least one cavity, wherein
        the lock structure is a first lock structure and the knife holder includes a second lock structure to lock the at least one knife with the at least one casing, and
        the second lock structure includes a gear adapted to be engaged with the associated knife, wherein the knife includes a plurality of teeth extending along a non-cutting edge of the knife and the gear engages with the plurality of teeth upon insertion of the knife inside the at least one casing;
    a switch adapted to be actuated by a user to enable an unlocking of the at least one casing from the block to enable a removal of the at least one casing from the block; and
    electronic circuitry configured to determine a presence of an authorized user in a vicinity of the knife holder and facilitates an unlocking of the at least one casing from the block in response to an actuation of the switch in the presence of the authorized user in the vicinity of the knife holder.

2. The knife holder of claim 1, further including a first actuator adapted to move the lock structure to an unlock state based on a signal received from the electronic circuitry and the actuation of the switch.

3. The knife holder of claim 1, wherein the gear includes a groove, and the second lock structure includes a pin adapted to be displaced to an extended position and a retracted position, wherein in the extended position, the pin extends inside the groove locking the gear with knife, and in the retracted position, the pin is arranged outwardly of the groove, enabling a rotation of the gear and removal of the knife from the associated casing.

4. The knife holder of claim 3 further comprising at least one second actuator to displace the pin from the extended position to the retracted position in response to at least one of a signal received from the electronic circuitry or the actuation of the switch.

5. The knife holder of claim 1, wherein the at least casing includes a first half portion and a second half portion removably or pivotably engaged with the first half portion.

6. A knife assembly, comprising:
at least one knife; and
a knife holder to securely hold the at least one knife, the knife holder includes
a block defining at least one cavity to receive the at least one knife,
at least one casing removably arranged inside the at least one cavity and adapted to be locked with the block, wherein the at least one knife is removably arranged inside the at least one casing,
a lock structure mounted to the block and configured to lock the at least one casing with the block to the prevent the removal of the at least one casing from the at least one cavity, wherein
the lock structure is a first lock structure and the knife holder includes a second lock structure to lock the at least one knife with the at least one casing, and
the second lock structure includes a gear adapted to be engaged with the associated knife, wherein the knife includes a plurality of teeth extending along a non-cutting edge of the knife and the gear engages with the plurality of teeth upon insertion of the knife inside the at least one casing,
a switch mounted to the block and adapted to be actuated by a user to enable an unlocking of the at least one casing from the block to enable a removal of the at least one casing from the block, and
electronic circuitry configured to determine a presence of an authorized user in a vicinity of the knife holder and facilitates an unlocking of the at least one casing from the block in response to an actuation of the switch in the presence of the authorized user in the vicinity of the knife holder.

7. The knife assembly of claim 6, wherein the knife holder further includes a first actuator adapted to move the lock structure to an unlock state based on a signal received from the electronic circuitry and the actuation of the switch.

8. The knife assembly of claim 6, wherein the gear includes a groove, and the second lock structure includes a pin adapted to be displaced to an extended position and a retracted position, wherein
in the extended position, the pin extends inside the groove locking the gear with teeth of the knife, and
in the retracted position, the pin is arranged outwardly of the groove, enabling a rotation of the gear to facilitate a removal of the knife from the associated casing.

9. The knife assembly of claim 8, wherein the knife holder further includes at least one second actuator to displace the pin from the extended position to the retracted position in response to at least one of a signal received from the electronic circuitry or the actuation of the switch.

10. The knife assembly of claim 6, wherein the at least casing includes a first half portion and a second half portion removably or pivotably engaged with the first half portion.

11. The knife assembly of claim 6 further including a wearable device adapted to be worn by a user and configured to communicate with the electronic circuitry, wherein the electronic circuitry determines the presence of the authorized user based on a signal received from the wearable device.

12. A knife assembly, comprising:
at least one knife;
a knife holder to securely hold the at least one knife, the knife holder includes
a block defining at least one cavity to receive the at least one knife,
at least one casing removably arranged inside the at least one cavity and adapted to be locked with the block, wherein the at least one knife is removably arranged inside the at least one casing,
a lock structure mounted to the block and configured to lock the at least one casing with the block to the prevent the removal of the at least one casing from the at least one cavity, wherein
the lock structure is a first lock structure and the knife holder includes a second lock structure to lock the at least one knife with the at least one casing, and
the second lock structure includes a gear adapted to be engaged with the associated knife, wherein the knife includes a plurality of teeth extending along a non-cutting edge of the knife and the gear engages with the plurality of teeth upon insertion of the knife inside the at least one casing;
a switch mounted to the block and adapted to be actuated by a user to enable an unlocking of the at least one casing from the block to enable a removal of the at least one casing from the block,
electronic circuitry configured to determine a presence of an authorized user in a vicinity of the knife holder, and
a first actuator adapted to move the lock structure to an unlock state to unlock the at least one casing from the block in response to an actuation of the switch and a signal received from the electronic circuitry; and
a wearable device adapted to be worn by a user and configured to communicate with the electronic circuitry, wherein the electronic circuitry determines the presence of the authorized user based on a signal received from the wearable device.

13. The knife assembly of claim 12, wherein the gear includes a groove, and the second lock structure includes a pin adapted to be displaced to an extended position and a retracted position, wherein
in the extended position, the pin extends inside the groove locking the gear with teeth of the knife, and
in the retracted position, the pin is arranged outwardly of the groove, enabling a rotation of the gear to facilitate a removal of the knife from the associated casing.

14. The knife assembly of claim 13, wherein the knife holder further includes at least one second actuator to displace the pin from the extended position to the retracted position in response to at least one of a signal received from the electronic circuitry or the actuation of the switch.

* * * * *